S. J. Baker,

Clog for Fowls.

No. 110,621. Patented Jan. 3, 1871.

WITNESSES.
P. C. Dieterich
L. J. M. Baber

INVENTOR.
S. J. Baker
per Munn & Co
ATTORNEYS.

United States Patent Office.

SANFORD J. BAKER, OF MADISON CENTRE, MAINE.

Letters Patent No. 110,621, dated January 3, 1871.

IMPROVEMENT IN FETTERS OR CLOGS FOR FOWLS.

The Schedule referred to in these Letters Patent and making part of the same.

*To all whom it may concern:*

Be it known that I, SANFORD J. BAKER, of Madison Centre, in the county of Somerset and State of Maine, have invented a new and useful Improvement in Fetter or Clog for Fowls; and I do hereby declare that the following is a full, clear, and exact description thereof, which will enable others skilled in the art to make and use the same, reference being had to the accompanying drawing forming part of this specification.

Figure 1:
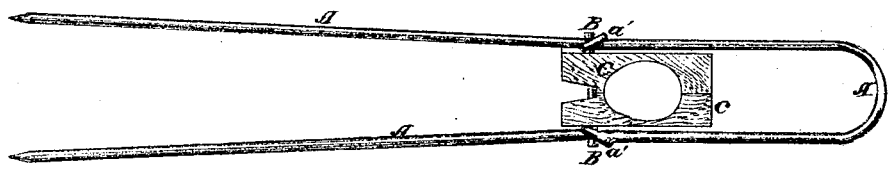
Figure 2:
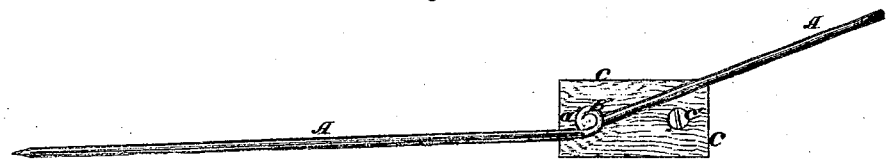

Figure 1 is a top view of my improved device.
Figure 2 is a side view of the same.

Similar letters of reference indicate corresponding parts.

My invention has for its object to furnish an improved fetter or clog for hens, turkeys, and other fowls, to prevent them from scratching in gardens, yards, fields, &c., which shall be simple in construction and effective in operation; and It consists in the fetter or clog, constructed as hereinafter more fully described.

A, a wire sharpened at its ends and bent in its middle part, so that its ends or arms may be parallel with each other, or nearly so.

The loop or forward end of the device is slightly bent or curved upward, as shown in fig. 2, so that it may not catch upon the ground when the fowl is walking.

In the arms of the bent wire A at a distance from its bend equal to about one-third of the distance from the said bend to its points, are formed eyes $a'$, to receive the ends of the pivoting-wire B.

The wire B passes through a hole in the rear part of the wooden jaws C, the forward ends of which are detachably secured to each other by a screw, $c'$, so that, by removing the said screw, the forward ends of the said jaws may be spread apart.

To enable this to be done conveniently, the adjacent edges of said jaws are beveled off, as shown in fig. 1.

The adjacent sides of the forward part of the jaws C are recessed to receive and fit loosely upon the leg of the fowl, care being had not to make the recess or hole thus formed so large that the fowl can draw its foot through said hole.

The device is made light, so that it may not impede the walking of the fowls, but should the fowl attempt to scratch, the pointed rear ends of the wire A will catch in the ground, and thus prevent the fowl from scratching.

I am aware that clogs have been employed which were so applied to the legs of fowls as to operate substantially like mine, but my invention pertains to an improved construction.

Having thus described my invention,

I claim as new and desire to secure by Letters Patent—

An improved fetter or clog for fowls, formed of the bent and pointed wire A, pivoting-wire B, and recessed wooden jaws C, said parts being constructed and arranged substantially as herein shown and described, and for the purpose set forth.

SANFORD J. BAKER.

Witnesses:
SETH NUTTING,
JOHN RENIER.